US011786979B2

(12) United States Patent
Zhou et al.

(10) Patent No.: US 11,786,979 B2
(45) Date of Patent: Oct. 17, 2023

(54) STRENGTH-BOOSTING DRILL CHUCK (71) Applicant: ZHEJIANG SANOU MACHINERY CO. LTD., Zhejiang (CN)

(72) Inventors: Wenhua Zhou, Zhejiang (CN); Xuebiao Tong, Zhejiang (CN)

(73) Assignee: ZHEJIANG SANOU MACHINERY CO. LTD., Zhejiang (CN)

( * ) Notice: Subject to any disclaimer, the term of this patent is extended or adjusted under 35 U.S.C. 154(b) by 458 days.

(21) Appl. No.: 16/909,116

(22) Filed: Jun. 23, 2020

(65) Prior Publication Data

US 2021/0001413 A1 Jan. 7, 2021

(30) Foreign Application Priority Data

Jul. 1, 2019 (CN) .......................... 201910585443.4

(51) Int. Cl.
*B23B 31/12* (2006.01)
(52) U.S. Cl.
CPC ...... *B23B 31/1238* (2013.01); *B23B 2231/12* (2013.01); *Y10T 279/17632* (2015.01)
(58) Field of Classification Search
CPC .................... B23B 2231/12; B23B 2231/1238
See application file for complete search history.

(56) References Cited

FOREIGN PATENT DOCUMENTS

CN 101147983 A * 3/2008

OTHER PUBLICATIONS

Machine Translation of CN101147983A (Year: 2008).*

* cited by examiner

*Primary Examiner* — Sunil K Singh
*Assistant Examiner* — Joshua S Hearne
(74) *Attorney, Agent, or Firm* — MUNCY, GEISSLER, OLDS & LOWE, P.C.

(57) ABSTRACT

The invention provides a strength-boosting drill chuck comprising a drill body, a nut and a clamping claw, which the nut and the clamping jaw forms a threaded connection, and the drill body is provided with an inclined clamping claw hole for the clamping claw to slide forward and backward along the clamping claw hole; wherein the drill chuck is provided with a strength-boosting structure of the connecting force of the nut clamping claw, which is provided with a liquid plastic component, and the structure for exerting force and transmitting force to the liquid plastic component, which enables the force on the liquid plastic component to be transmitted to the nut. The invention can use the liquid plastic component to transmit force, greatly enhance the binding force between the nut and the clamping claw, and increase the force to resist the reverse force and the inertia force. Whether it is a hand tight drill chuck or a drill chuck with self-locking function, it can cope with the adverse effects caused by various reasons on the drill chuck to hold the drill bit and keep the locking state, and significantly improve the properties of the drill chuck, and prevent loosening during drilling.

13 Claims, 14 Drawing Sheets

STRENGTH-BOOSTING DRILL CHUCK

TECHNICAL FIELD

The present disclosure generally relates to a drill chuck, in particular to a hand-tight drill chuck.

BACKGROUND

The drill chuck is provided with drill body, clamping jaw, and nut. The nut and the clamping jaw are connected by threads. The hand-tight drill chuck is provided with a rotating sleeve. The rotating sleeve and the nut are connected directly or through a connecting structure. Through operating the rotating sleeve by hand, the rotating nut drives the clamping claw to move forward or backward to clamp or loosen the drill bit. In practice, when the bit is clamping for drilling, there are many reasons that may cause the bit clamping by the gripper to be loose or the locking state of the bit chuck to fail.

SUMMARY

The technical problem to be solved by the present invention is to provide a strength-boosting drill chuck, which can increase the clamping force of the clamping claw to clamp the workpiece, and prevent the nut from loosening in reverse during operation. Therefore, the invention adopts the following technical solutions:

A strength-boosting drill chuck comprises a drill body, a nut and a clamping claw, which the nut and the clamping jaw forms a threaded connection, and the drill body is provided with an inclined clamping claw hole for the clamping claw to slide forward and backward along the clamping claw hole; it is characterized in that the drill chuck is provided with a strength-boosting structure of the connecting force of the nut and the clamping claw, the strength-boosting structure is provided with a liquid plastic component, and a structure that exerts force and transmits force to the liquid plastic component, so that the force on the liquid plastic component can be transmitted to the nut.

In terms of technologies adopting the above technical solutions, the present invention can also adopt the following further technical solutions, or use them in combination:

The structure for exerting force and transmitting force to the liquid plastic component is provided with a piston; the liquid plastic component is provided with a piston hole, which the piston can be inserted into the piston hole to exert force to the liquid plastic component; or the piston exerts force to the liquid plastic component from the outside of the liquid plastic component.

The drill chuck is provided with a clutch connection structure, and the structure for exerting force and transmitting force to the liquid plastic component is provided with a structure for exerting force to the liquid plastic component; the clutch connection structure is connected with the nut instead of the strength-boosting structure when the drill chuck is not in the clamping state, and is connected with the structure for exerting force to the liquid plastic component instead of connecting with the nuts after the drill chuck is changed from the unclamping state to the clamping state, wherein the clutch connection structure is provided with a portion that receives external force and can rotate under the drive of external force, and drives the nut to rotate when the drill chuck is not in the clamping state through rotation, and drives the structure for exerting force to the liquid plastic component through continuous rotation in the same direction when the drill chuck is in the clamping state, and transmits force to the liquid plastic component.

The clutch connecting structure includes a radially elastic ring and the ring is axially limited, wherein the structure for exerting force to the liquid plastic component is provided with a connecting sleeve, where the ring is between the connecting sleeve and the nut, with the inner side to be configured to match and connect with the nut keyway, and the outer side to be configured to connect with the connecting sleeve; the ring is configured with a control structure so that when the drill chuck is not in the clamping state, the ring and the nut are connected through matching keyway, and the ring is disconnected from the connecting sleeve; when the drill chuck is in the clamping state, the ring and the nut are disengaged from the matching keyway connection, and the ring is connected with the connecting sleeve on the outside.

The clutch connection structure includes a radially elastic ring which can be connected with the nut through matching keyway; the ring is configured with a control structure, so that when the drill chuck is not in the clamping state, the ring and the nut are connected through matching keyway, but the ring is not connected with the structure for exerting force to the liquid plastic component; when the drill chuck is in the clamping state, the ring and the nut are disengaged from the matching keyway connection, and the ring is connected to the structure which exerts force to the liquid plastic component.

The structure for exerting force to the liquid plastic component is provided with a piston; the liquid plastic component is provided with a piston hole, and the piston can be inserted into the piston hole to exert force on the liquid plastic component; or, the piston exerts force to the liquid plastic component from the outside of the liquid plastic component; when the drilling chuck is in the clamping state, the ring and the nut are disengaged from the matching keyway connection, and the ring exerts a force to the piston through elastic deformation to achieve the connection with the structure for exerting force to the liquid plastic component.

The structure for exerting force and transmitting force to the liquid plastic component is provided with a structure for exerting the force to the liquid plastic component; the structure for exerting force to the liquid plastic parts includes a connecting sleeve, which is in threaded connection with the component fixed on the drill body, and the piston is connected with the connecting sleeve.

The liquid plastic component is provided with a metal shell as a structure for transmitting force forward.

The liquid plastic component is an annular component, and an axial support structure is provided behind it.

A piston hole is arranged at the rear end or the outer side of the liquid plastic component.

The rear end of the nut is provided with a convex edge, and the key provided on the inner side of the ring is matched with the convex edge to perform axial limit on the rear side.

The control structure is provided between the ring and the nut.

The liquid plastic component is provided with a metal shell as a structure for transmitting force forward; the component fixed on the drill body is supported on the steps on the drill body and is padded under the metal shell; the structure for exerting force and transmitting force to the liquid plastic component is provided with a piston; the component fixed on the drill body is provided with a piston hole, and the piston passes through the piston hole on the component fixed on the drill body; or furthermore, the bottom wall of the metal shell is also provided with a piston hole, and the piston passes through the piston hole on the component fixed on the drill body and the piston hole on the bottom wall of the metal shell.

By adopting the technical solution of the present invention, the present invention can apply the liquid plastic component to transmit force, and can greatly enhance the binding force between the nut and the clamping claw, and increase the resistance to the reverse force and inertia force; no matter whether it is a hand tight drill chuck or a drill chuck with self-locking function, it can cope with the adverse effects of a variety of reasons on the drill chuck holding the drill bit and maintaining the locked state, and significantly improve the performance of the drilling chuck and prevent the loosening in the drilling work.

DETAILED DESCRIPTION

For embodiment 1, refer to FIG. 1-10.

Figure 1:
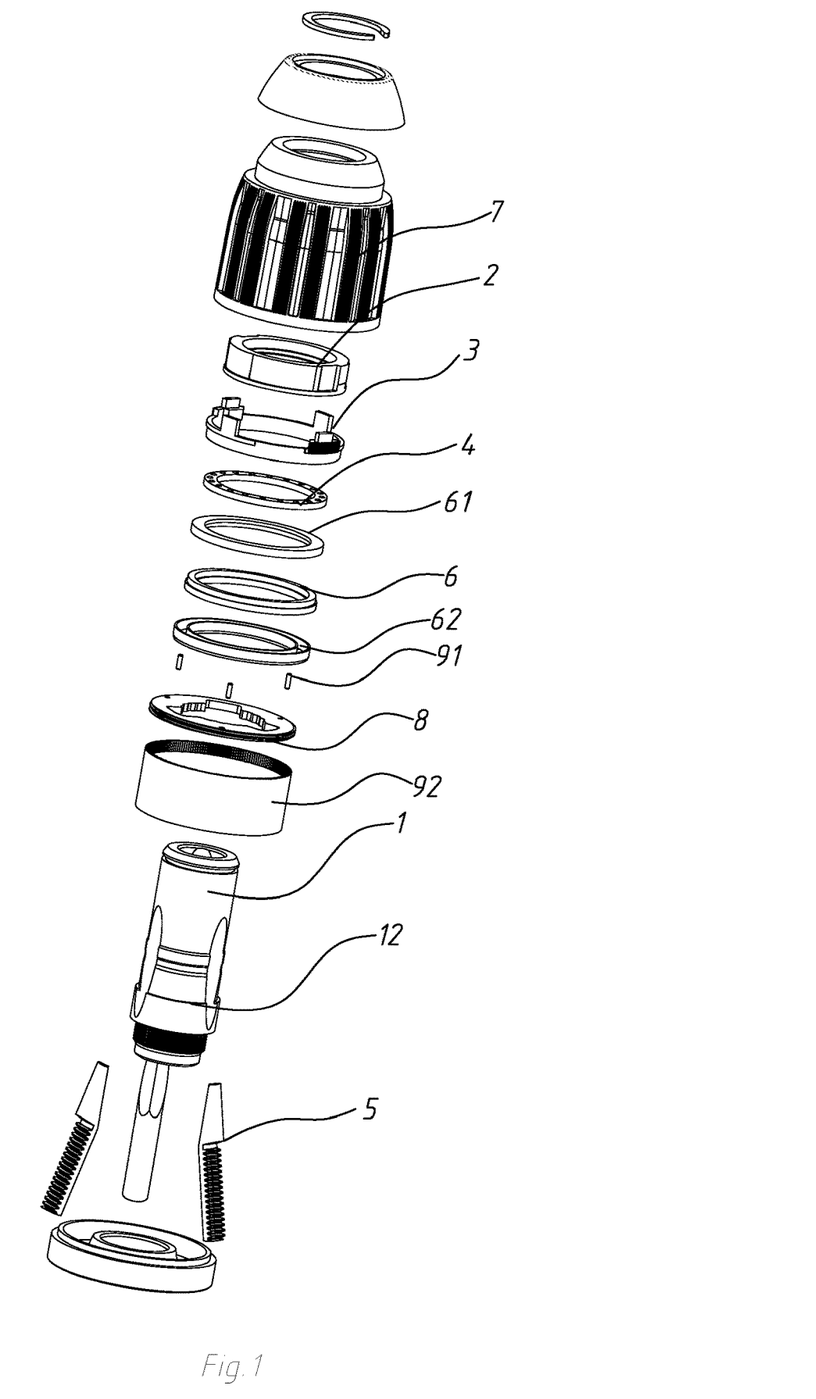
FIG. 1 is an exploded view of embodiment 1 of the present invention.
Figure 2:
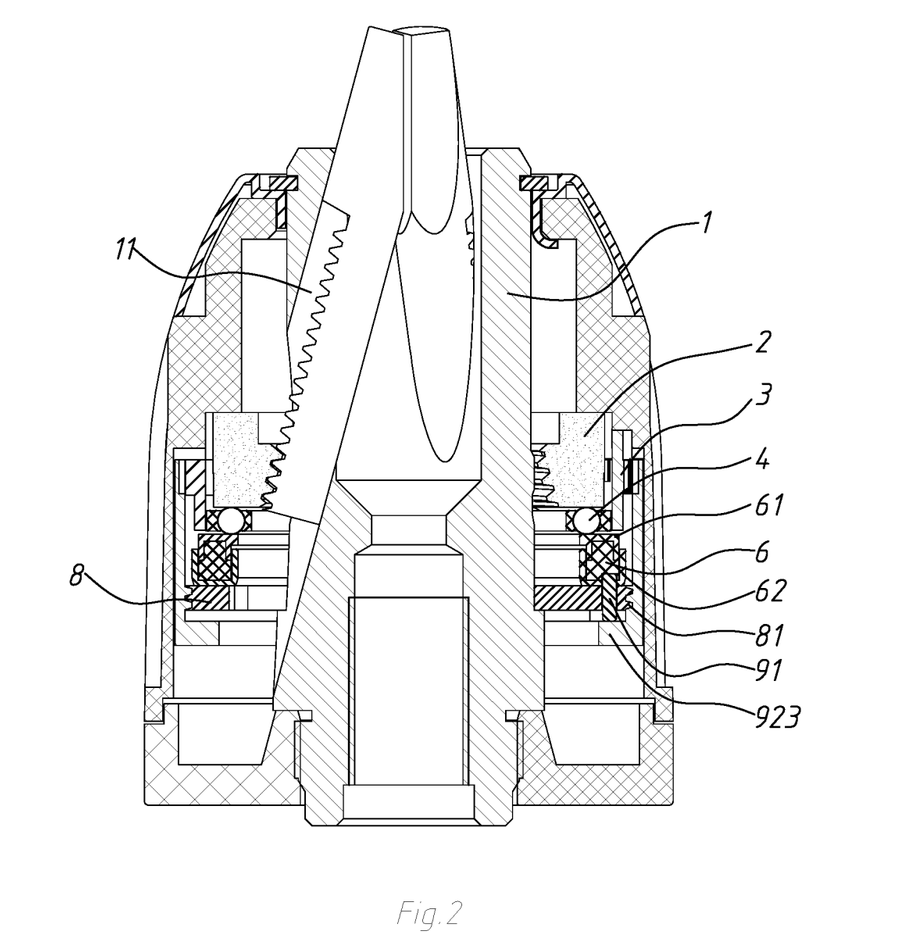
FIG. 2 is a cross-sectional view of embodiment 1 of the present invention.

The drill chuck provided by the invention comprises a drill body 1, a nut 2 and a clamping claw 5, which the nut 2 and the clamping claw 5 are in threaded connection, and the drill body is provided with an inclined clamping claw hole 11 for the clamping claw 5 to slide forward and backward along the clamping claw hole 11. The drill chuck is provided with a strength-boosting structure for the connecting force of the nut 2 and the clamping claw 3, and the strength-boosting structure is provided with a liquid plastic component 6 and a structure for exerting force and transmitting force to the liquid plastic component 6, which the force input by the strength-boosting structure passes through the liquid plastic component 6, and the force received by the liquid plastic component can be transmitted to the nut. When the drill chuck is in a clamping state (i.e. the drill bit is clamping), it can start to act and output forward force, so that the nut 2 id not loose in the axial direction and maintain a stronger thread binding force with the clamping jaw 3.

A bearing 4 surrounding the drill body 1 is padded behind the nut 2, and the bearing comprises a plurality of steel balls arranged in the circumferential direction and bearing frames for limiting the steel balls, or other surfaces, grooves and grease for limiting the steel balls without setting the bearing frame. The bearing can be padded between the strength-boosting structure and the nut, and the force transmitted from the strength-boosting structure to the nut passes through the bearing. Alternatively, the force transmitted by the strength-boosting structure to the nut may exert directly to the nut or exert to the nut through other intermediate structures without setting the bearing.

The structure for exerting force and transmitting force to the liquid plastic component is provided with a plurality of pistons 91, so that the liquid plastic component can receive the force both intensively and uniformly. The pistons 91 can be in the form of pins and columns with the cross section being circular, square, etc., and the liquid plastic component 6 is a annular component, and a plurality of pistons 91 are arranged in a circumferential direction, which for this embodiment, three pistons 91 are provided.

The structure for exerting force and transmitting force to the liquid plastic component is also provided with a tightening structure of the piston 91, so that the piston 91 can be inserted into the piston hole to exert force to the liquid plastic component; or, the piston can exert force to the liquid plastic component from the outside of the liquid plastic component.

In the embodiment, the liquid plastic component 6 is provided with a piston hole 60 corresponding to the piston 91 one by one. The piston 91 can be inserted into the piston hole 60 and cooperate with the hole wall and/or the bottom of the hole to produce dimensional interference. When the tightening mechanism of the piston 91 starts to function, the piston is inserted into the piston hole or the insertion volume in the piston hole is increased.

For the operation of the strength-boosting structure, the respective methods can be adopted, i.e. the nut 2 can be independently driven by the rotating sleeve 2 to rotate the clamping bit into the clamping state. Then, input the torque through another input component to drive the tightening structure and transmit force. As a preferred choice, the clutch connection structure can be adopted so that the rotation drive of the nut 2 and the external force input of the tightening structure can be carried out through the same component, such as the rotating sleeve 7 and the following ring 3.

The clutch connection structure is connected with the nut 2, but is not connected with the structure which exerts force to the liquid plastic component 2 when the drill chuck is not in the clamping state, and is connected with the structure which exerts force to the liquid plastic component, but is not connected with the nut 2 when the drill chuck is in the clamping state, wherein the clutch connection structure is provided with a component which receives external force and can be rotated under the drive of the external force, which the rotating part can be used as a connection with the operating parts such as the rotating sleeve 7, for example, the connecting key 33 on the ring 3 described below. In this way, through rotation operation, the nut can be driven to rotate when the drill chuck is not in the clamping state, and when the drill chuck enters the clamping state from the unclamping state, there is no need to replace or for other operations, and it can directly continue to rotate in the same direction, which can drive the structural motion of exerting force to the liquid plastic component 2, and transmit the force to the liquid plastic component 6, which is very convenient to operate.

The clutch connection structure includes a radial elastic ring 3, which is axially limited, and may be a steel ring that can be flattened to a certain extent and can rebound and recover. The structure for exerting force to the liquid plastic component is provided with a connecting sleeve 92; the ring 3 is between the connecting sleeve 92 and the nut 2; and the inner side of the ring 3 is configured to be able to match and connect with the keyway of the nut 2. Therefore, preferably, the ring 3 is provided with a key 34; the nut 2 is provided with a slot 21 which is matched with the key 34; and the outer side of the ring 3 is configured to be able to connect with the connecting sleeve. In order to facilitate the connection between each of the angle positions, the tooth engagement method can be used for connection. An arc-shaped rack 31 is arranged on the outer side of the ring 3, and a ring of teeth 921 is arranged on the inner wall of the connecting sleeve 92. The ring 3 is configured with a control structure, so that when the drilling chuck is not in the clamping state, the ring 3 and the nut 2 are connected through matching keyway, and the ring is disengaged from the connecting sleeve 92 (see FIG. 9). When the drilling chuck is in the clamping state, the ring 3 can be disengaged from the matching keyway connection with the nut during rotation due to the function of the control structure, and moderately deformed into a slightly elliptical shape (see FIG. 10), and the ring 3 is connected with the connecting sleeve 92 on the outside.

Figure 7:
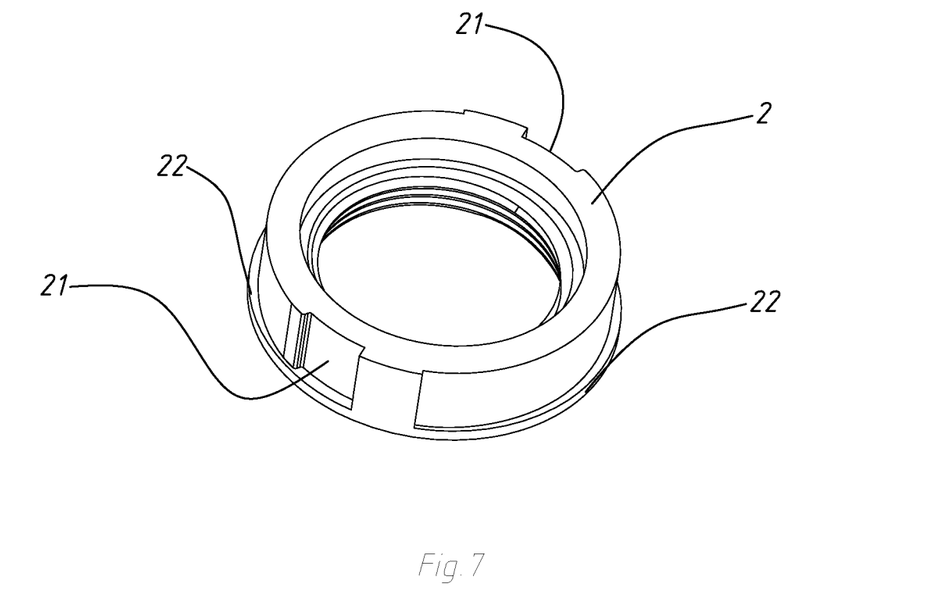
FIG. 7 is a schematic diagram of the nut according to embodiment 1 of the present invention.
Figure 8:
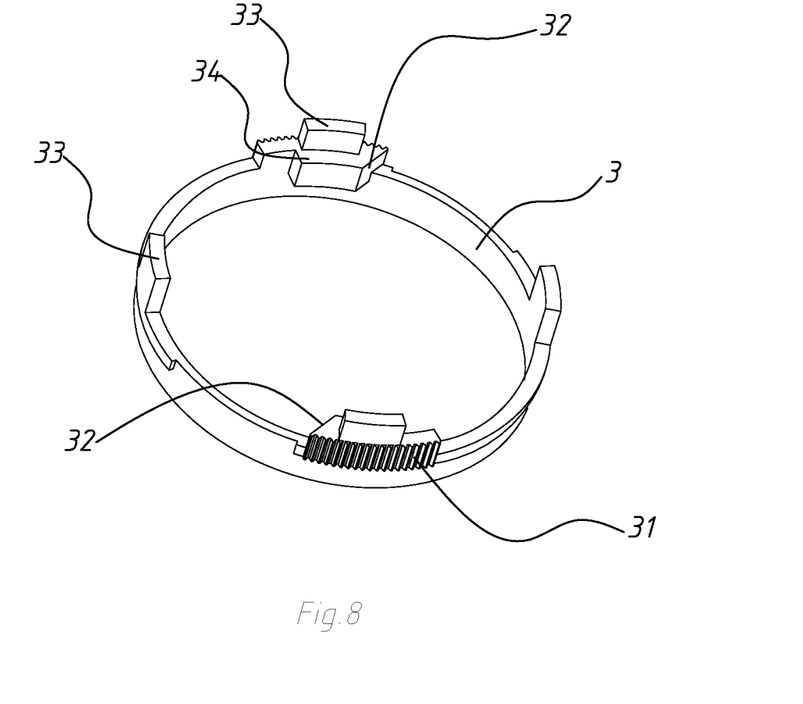
FIG. 8 is a schematic diagram of the ring in embodiment 1 of the present invention.
Figure 9:
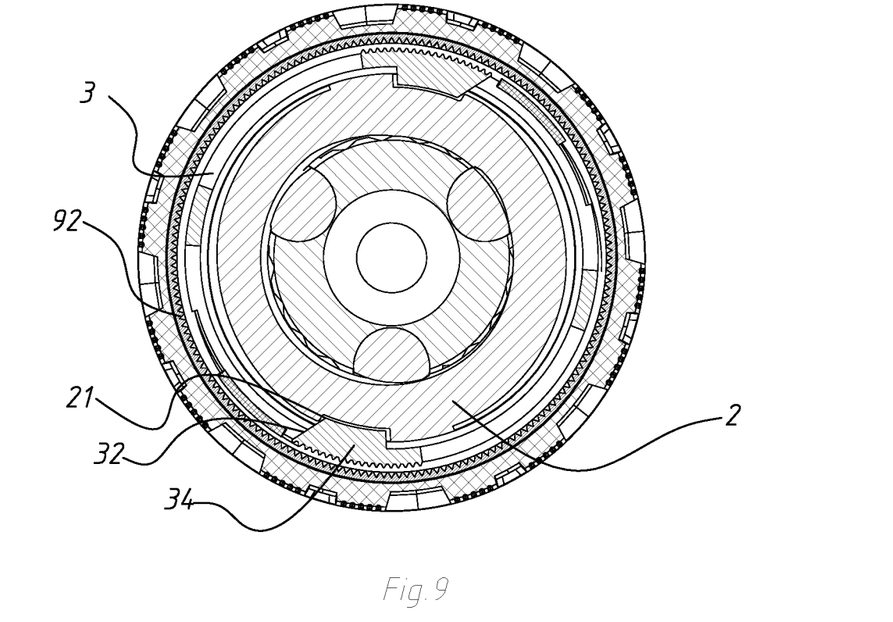
FIG. 9 is a cross-sectional view of the drill chuck in the unclamping state of embodiment 1 when the ring is connected with the nut.
Figure 10:
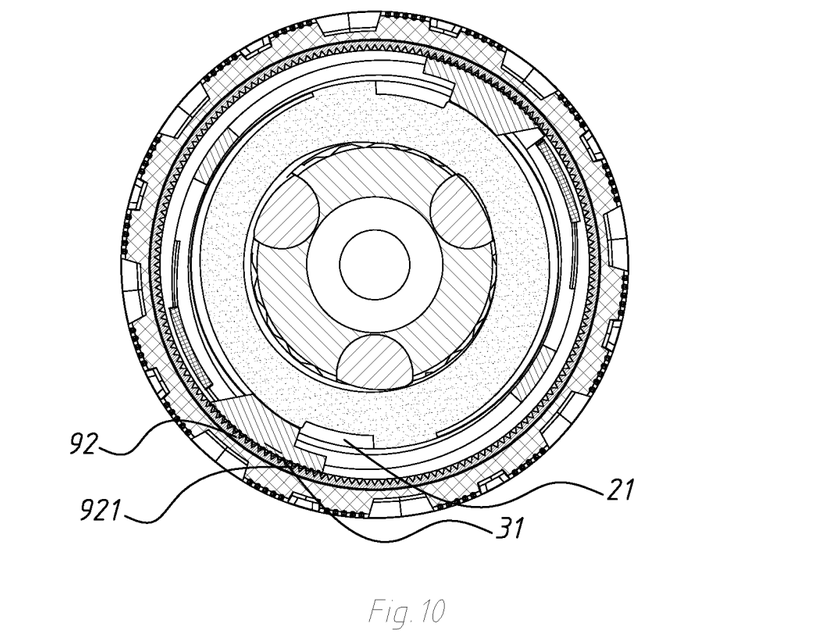
FIG. 10 is a cross-sectional view of the connection between the ring and the connecting sleeve when the drill chuck of embodiment 1 is in the clamping state.

For the control structure, a cam structure can be adopted, preferably setting the control structure between the ring 3 and the nut 2. The cam structure includes a cam surface 32 on the side of the key 34 on the ring 3; the cam surface also utilizes the inner side of the key 34; and the structure matched with the cam surface is the groove wall at the mouth of the groove 21 of the nut and the outer wall of the outer nut.

For the axial limit of the ring 3, the front limit can use the bulge in the rotating sleeve of the drill chuck; the convex edge 22 can be provided at the rear end of the nut 2; and the key 34 set at the inner side of the ring 3 can cooperate with the convex edge 22 to carry out the rear axial limit, so that the effect of the thread binding force of the nut and the clamping claw can be further strengthened.

Figure 3:
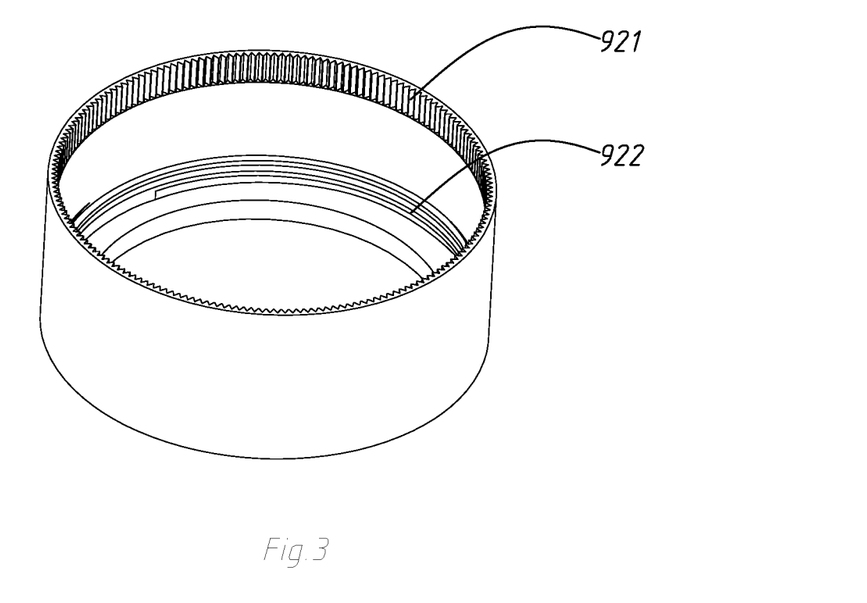
FIG. 3 is a schematic diagram of the connecting sleeve of embodiment 1 of the present invention.
Figure 4:
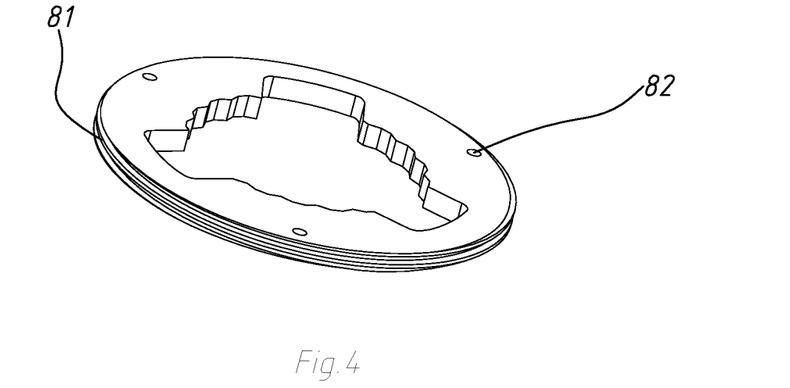
FIG. 4 is a schematic diagram of the component that is in threaded connection with the connecting sleeve fixed on the drill body in embodiment 1 of the present invention.

The structure for exerting force to the liquid plastic component changes the direction of the torque input through the ring 3 and transmits it by lifting the connecting sleeve 92. The connecting sleeve 92 is in threaded connection with the component 8 fixed on the drilling body 1, wherein the component can be a gasket with a certain thickness, and an external thread 81 is provided on its periphery.

Figure 5:
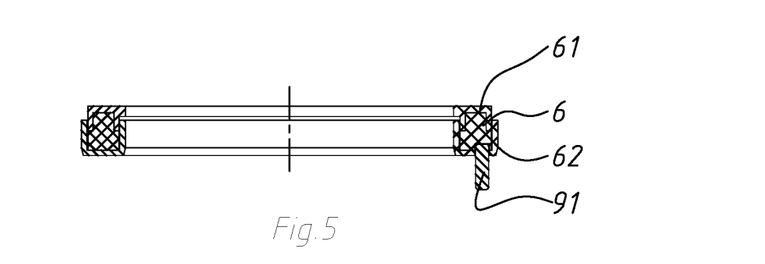
FIG. 5 is a cross-sectional view of a part of the strength-boosting structure of embodiment 1 of the present invention.
Figure 6:
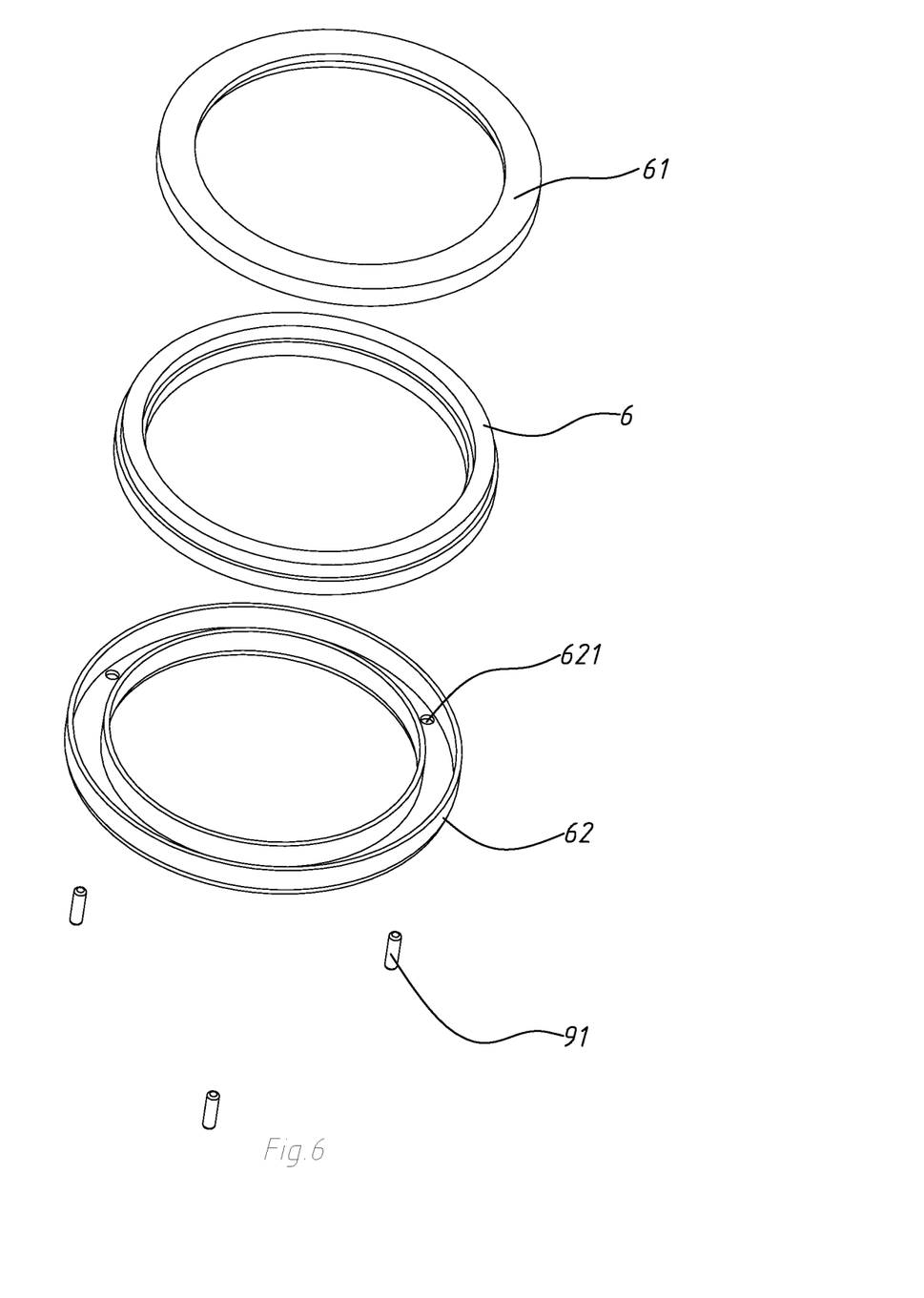
FIG. 6 is an exploded view of the structure of FIG. 5.

The liquid plastic component 6 is provided with a metal shell as a structure to transmit force forward. The metal shell has an inner cavity adapted to the liquid plastic component 6, and for the annular liquid plastic component 6, the metal shell is also an annular shell. For ease of assembly, it can be divided into upper shell 61 and lower shell 62, which are mutually inserted.

The top of the metal shell is padded under the bearing 4 to transmit force forward to the bearing 4, and the component 8 fixed on the drill body is supported on the step 12 on the drill body and padded under the metal shell.

The lower shell 62 and the component 8 fixed on the drill body 1 have piston holes 621 and 82 for the piston 91 to pass through and slide, and the piston 91 is connected with the connecting sleeve 92 by supporting on the inward folded edge 923 at the bottom of the connecting sleeve 92.

Figure 11:
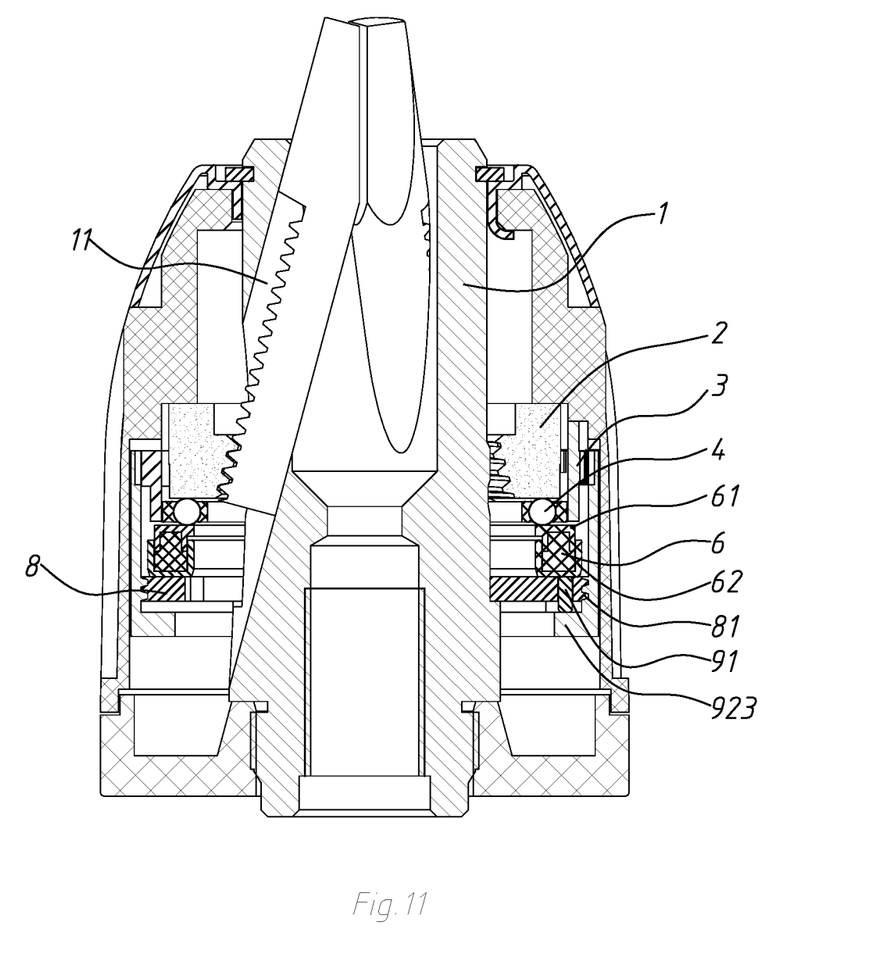
FIG. 11 is a cross-sectional view of embodiment 2 of the present invention.

For embodiment 2, refer to FIG. 11.

In this embodiment, it is basically the same as embodiment 1, except that the lower shell 62 does not have piston holes of the piston 91, the piston 91 directly applies to the lower shell 62 outside the liquid plastic component 6, and transmits force to the liquid plastic component 6 through the lower shell 62, and the force received by the liquid plastic component 6 is transmitted forward through the upper shell 61.

The inward folded edge 923 at the bottom of the connecting sleeve 92 acts as the tightening component in the piston tightening structure of the structure for exerting force to the liquid plastic component 6, and drives the piston 91 to rise through the upward movement of the inward folded edge 923 at the bottom of the connecting sleeve 92, so that the piston 91 exerts force on the liquid plastic component from the outside of the liquid plastic component.

Other parts of this embodiment are the same as those in embodiment 1, and the same components as embodiment 1 use the same labels.

For embodiment 3, refer to FIG. 12-15.

Figure 12:
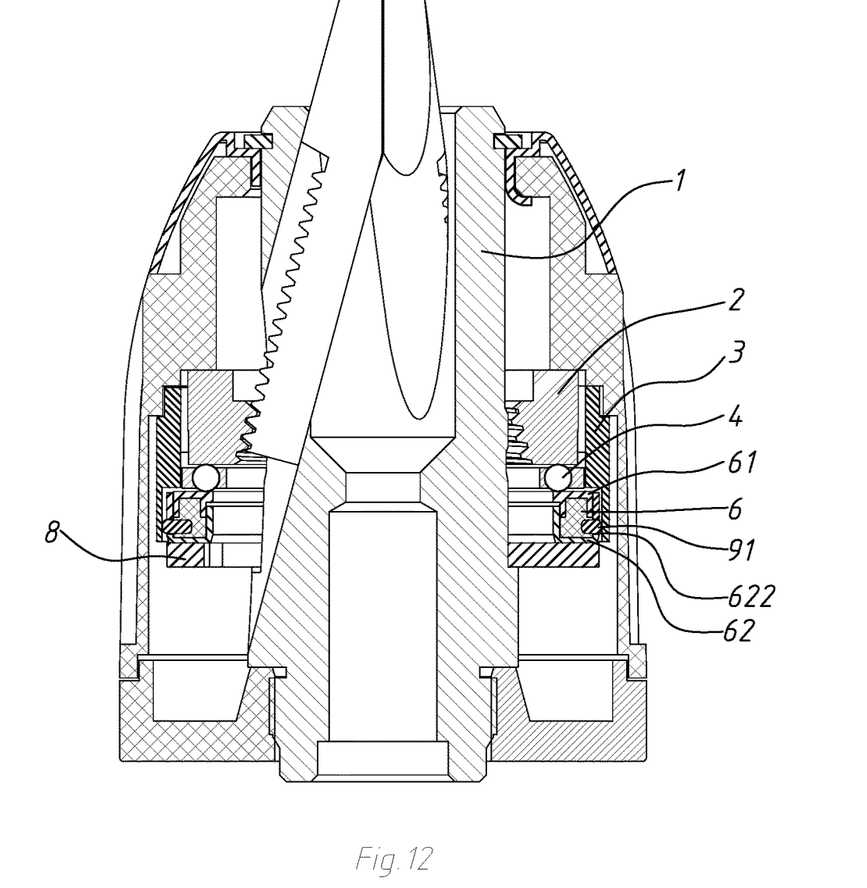
FIG. 12 is a cross-sectional view of embodiment 3 of the present invention.
Figure 13:
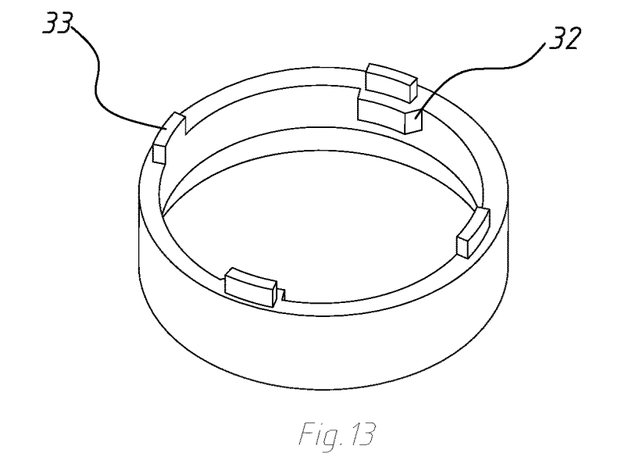
FIG. 13 is a cross-sectional view of the ring in embodiment 3 of the present invention.
Figure 14:
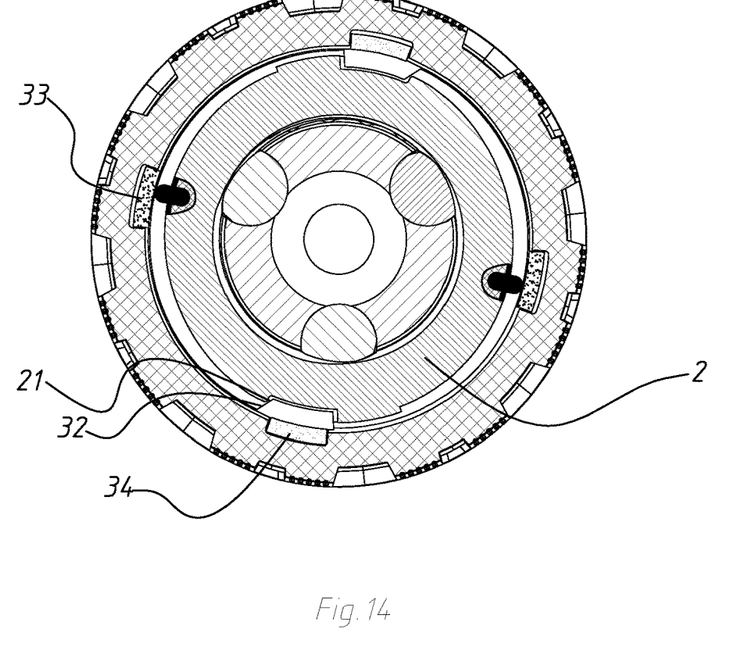
FIG. 14 is a cross-sectional view of the connection between the ring and the nut when the drill chuck of embodiment 3 is in the unclamping state.
Figure 15:
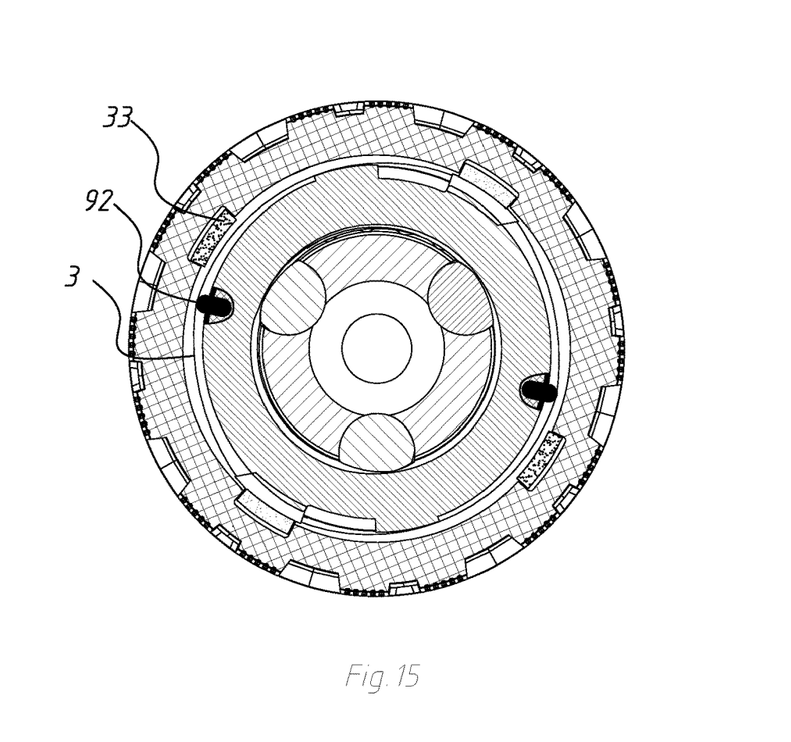
FIG. 15 is a cross-sectional view of the connection between the ring and the piston when the drill chuck of embodiment 3 is in the clamping state.

In the embodiment, the movement direction of the piston is changed from up-down movement to radial forward-backward movement. The radial elastic ring 3 in the clutch connection structure of the embodiments 1 and 2 can be directly used as the piston tightening component in the piston tightening structure, therefore, the connection sleeve of the embodiments 1 and 2, the connection structure between the ring 3 and the connection sleeve, and the connection structure between the connection sleeve and the component 8 fixed on the drill body 1 can be omitted. The component 8 may not necessarily be fixed to drill body 1.

When the drill chuck is not in the clamping state, the ring 3 and the nut 2 are connected through matching keyway, and there is a gap with the radial piston 91 to disconnect the connection (see FIG. 14), and when the drill chuck is in the clamping state, the ring 3 can be disengaged from the keyway during the rotation due to the function of the control structure and is moderately deformed into a slightly elliptical shape (see FIG. 15), which the short axis of the ellipse is shorter than the diameter of the ring in free state, so that the inner wall of the ring 3 in this position can squeeze the piston 91 to achieve the connection between the two. The squeezed piston 91 moves inward and is inserted into the piston hole 60 on the outer side of the liquid plastic component 6, and the side of the lower shell is also provided with a piston hole 622 for the piston to pass through and slide.

Other parts of the embodiment are the same as those in embodiment 1, and the same components as in embodiment 1 use the same labels.

Figure 16:
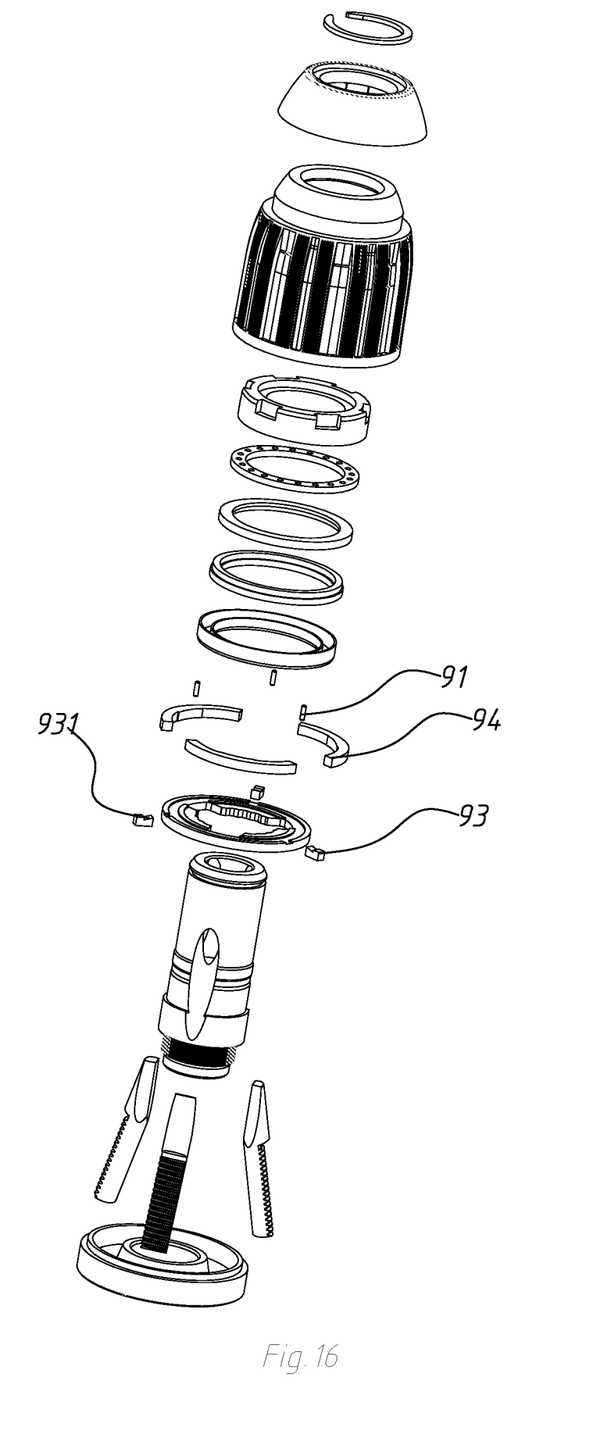
FIG. 16 is an exploded view of embodiment 4 of the present invention.
Figure 17:
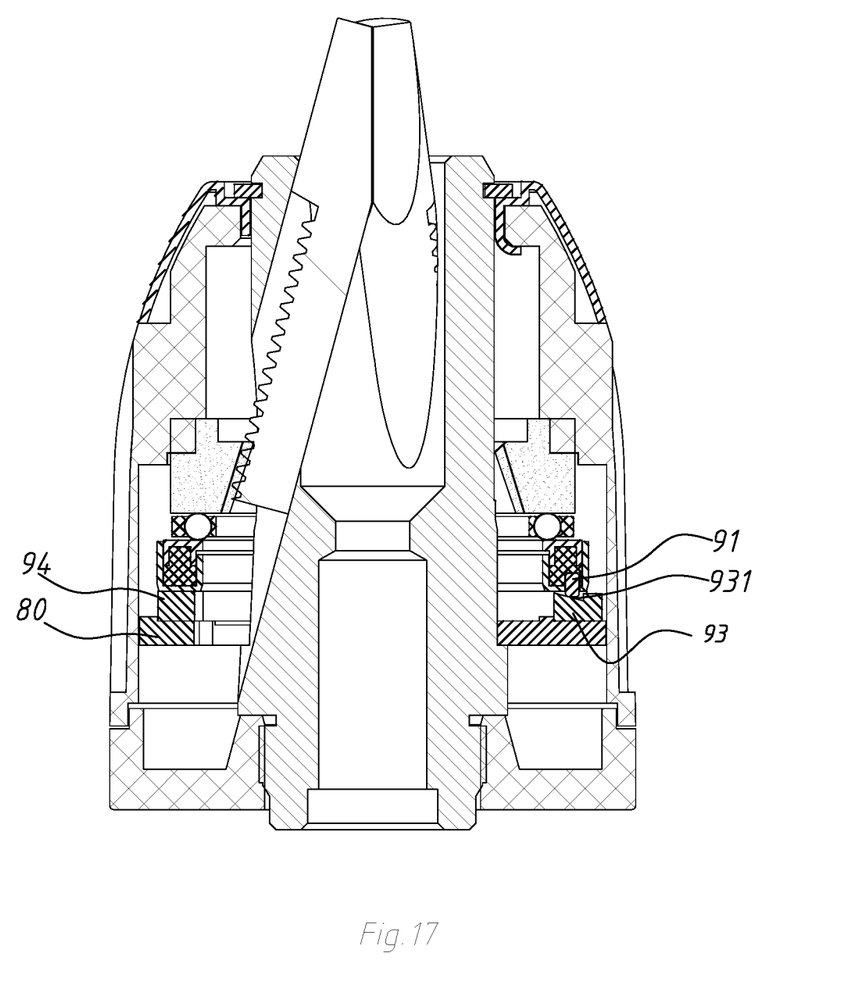
FIG. 17 is a cross-sectional view of embodiment 4 of the present invention.
Figure 18:
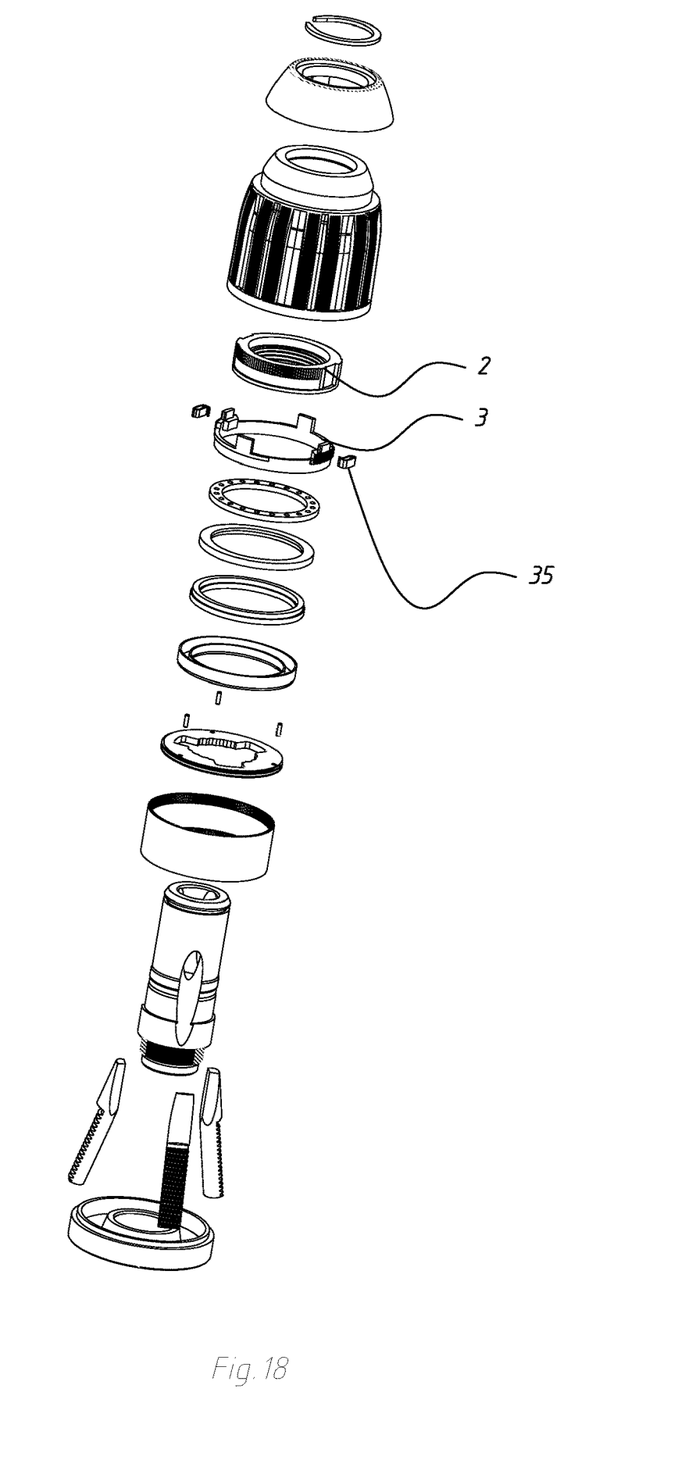
FIG. 18 is an exploded view of embodiment 5 of the present invention.
Figure 19:
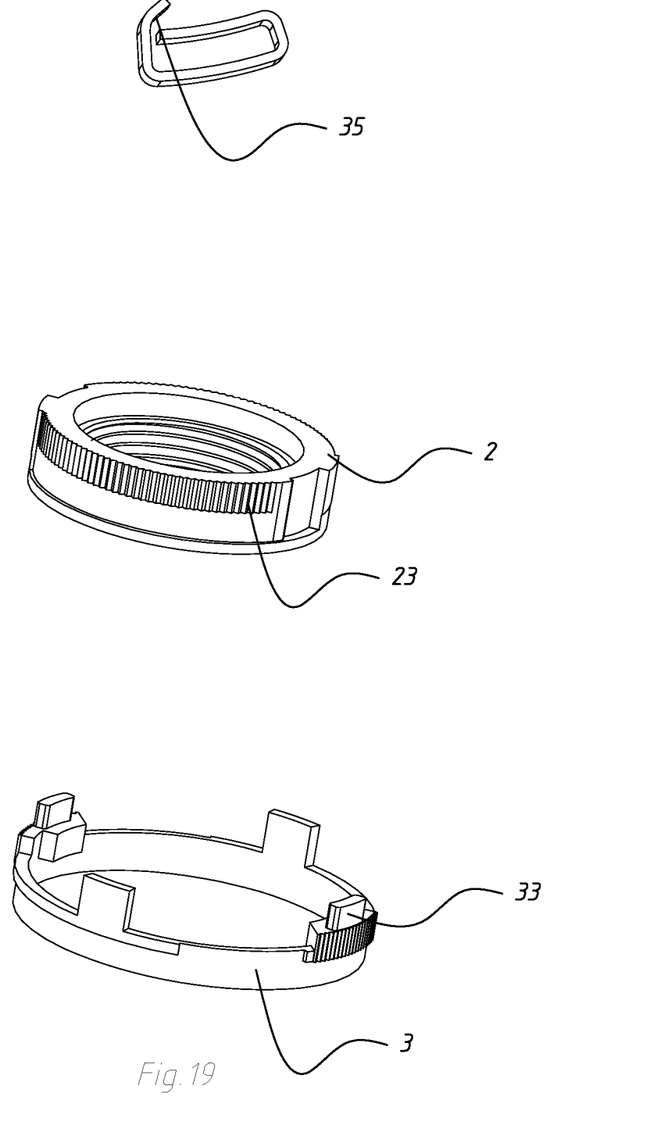
FIG. 19 is an exploded view of the combination of the ring member, the nut and the elastic claw in embodiment 5 of the present invention.
Figure 20:
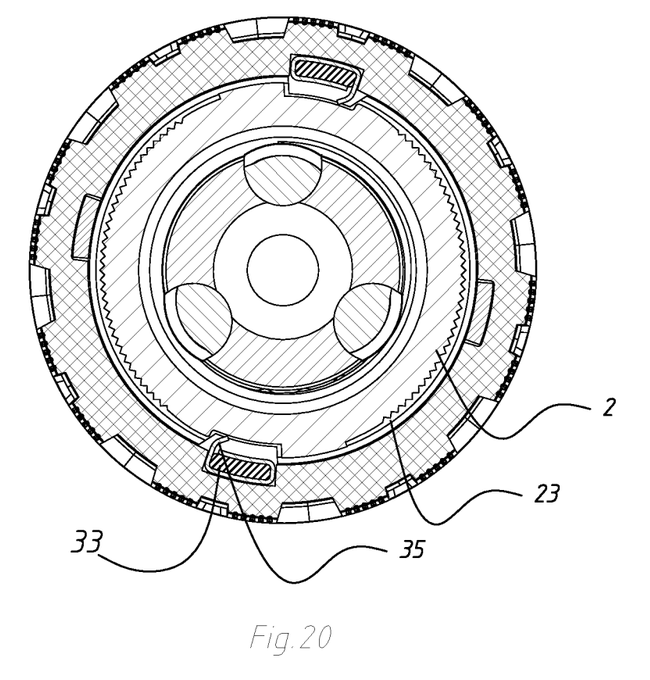
FIG. 20 is a cross-sectional view showing the structure state of the drill chuck in the unclamping state in embodiment 5 of the present invention.
Figure 21:
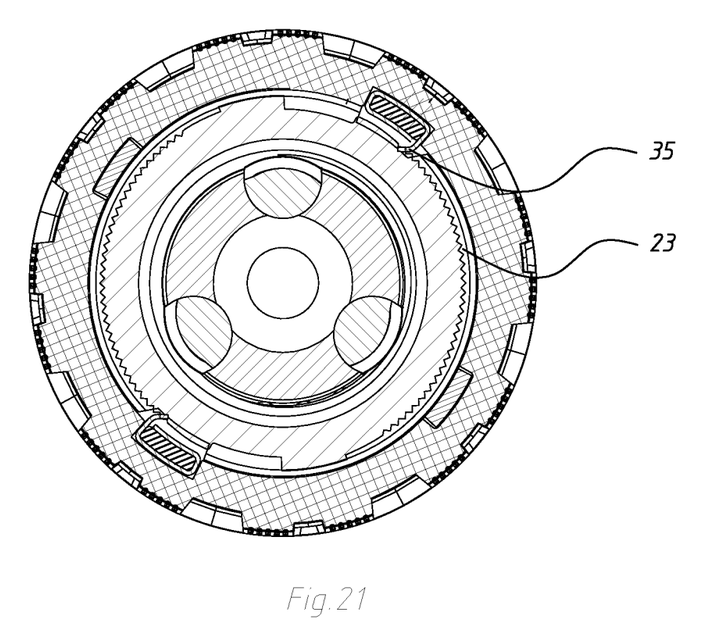
FIG. 21 is a cross-sectional view showing the structure state of the drill chuck in the clamping state in embodiment 5 of the present invention.

For embodiment 4, refer to FIG. 16-17.

In this embodiment, the tightening structure of the piston is changed. The structure for exerting force and transmitting force on the liquid plastic component is provided with a structure for exerting force on the liquid plastic component. When the drilling chuck in the clamping state rotates, the centrifugal force is used to automatically exert force to the liquid plastic component, so that the strength-boosting structure outputs the forward force, while the nut 2 is not loose in the axial direction and the thread binding force with the clamping claw 3 is maintained more powerful.

The structure for exerting force to the liquid plastic component includes a piston 91 and a cam block 93 described below.

The pad block 80, which is fixedly connected with the drill body, is an axial support structure provided behind the liquid plastic component 6, on which a cam block 93 capable of radial movement is provided. The cam block 93 corresponds to the piston 91 one by one and is under the piston 91. The cam block 93 has an inclined plane 931. When the drill chuck rotates, the cam block 03 moves radially outward, and the inclined plane 931 is used to drive the piston 91 to move upward (front). The structure of the piston hole 60 and the metal shell on the liquid plastic component 6 are the same as those in embodiment 1 or the same as those in embodiment 2.

For the convenience of assembly, the radial movement guidance of the cam block 93 can be achieved by using arc-shaped guide blocks 94 provided on both sides of the cam block 93. The arc-shaped guide block 94 forms a guide groove for the radial movement between the arc-shaped guide blocks 94, and the top surface of the arc-shaped guide block 94 (or the top surface of other components or structures set by the component 80) is higher than the top height of the cam block 93. When the drill chuck is in a non-rotating state, the arc-shaped guide block 94 (or the top surface of other components or structures provided by the component 80) pads the bottom of the metal shell. The arc-shaped guide block 94 and the component 80 may be separated.

The other parts of this embodiment are the same as those in embodiment 1, and the same components as in embodiment 1 use the same labels.

For embodiment 5, refer to FIG. 18-21.

In this embodiment, for the structure of embodiments 1, 2 and 3, the drill chuck is also provided with a strength-boosting operation prompt structure, which includes the elastic claw 35 on the ring 3, and racks 23 are set at the height of the elastic claw 35 of the outer surface of the nut 2 and through the area. When the ring 3 drives the nut 2 to rotate until the drill bit is clamping, and then continues to rotate, the ring 3 of the drill chuck participates in the structure of exerting force to the liquid plastic component, and the drill chuck is in the state of strength-boosting operation. At this time, the ring 3 rotates relative to the nut 2, and the elastic claw 35 slides over the surface of the rack 23 and is pulled to make a clattering sound, indicating that the drill chuck is in the state of strength-boosting operation. The elastic claw 35 can be formed by a spring piece, which is sleeved on the key 33 of the ring 3, and its free end is used as the claw.

The other parts of this embodiment are the same as those in embodiment 1, and the same components as in embodiment 1 use the same labels.

The above are only specific embodiments of the present invention, but the structural features of the present invention are not limited thereto. Any changes or modifications made by those skilled in the art in the field of the present invention are covered by the protection scope of the present invention.

The invention claimed is:

1. A strength-boosting drill chuck comprising a drill body, a nut and a clamping claw, the drill body being provided with an inclined clamping claw hole for the clamping claw to slide forward and backward along the clamping claw hole; wherein the drill chuck is provided with a strength-boosting structure for connecting the nut and the clamping claw, the strength-boosting structure is provided with a liquid plastic component, and a structure for exerting and transmitting force to the liquid plastic component, so that the force on the liquid plastic component can be transmitted to the nut, and the drill chuck is provided with a clutch connection structure, and the structure for exerting and transmitting force to the liquid plastic component is provided with a structure for exerting force to the liquid plastic component the clutch connection structure is connected to the nut but not to the strength-boosting structure when the drill chuck is not in a clamping state, and the clutch connection structure is connected with the structure for exerting force to the liquid plastic component without being connected to the nut after the drill chuck is changed from the unclamping state into the clamping state; the clutch connection structure is provided with a portion that receives external force and can be driven to rotate by the external force, and by rotation, the drill chuck drives the nut to rotate when the drill chuck is not in clamping state; when the drill chuck is in the clamping state, the continuous rotation in the same direction drives a structural movement that exerts force to the liquid plastic component, and the force is transmitted to the liquid plastic component.

2. The strength-boosting drill chuck according to claim 1, wherein the structure for exerting and transmitting force to the liquid plastic component is provided with a piston;

the liquid plastic component is provided with a piston hole, and the piston exerts force to the liquid plastic component through the piston hole or from outside of the liquid plastic component.

3. The strength-boosting drill chuck according to claim 2, wherein the structure for exerting and transmitting force to the liquid plastic component is provided with a structure for exerting force to the liquid plastic component; the structure for exerting force to the liquid plastic component includes a connecting sleeve, which is in threaded connection with a component fixed on the drill body, and the piston is connected with the connecting sleeve.

4. The strength-boosting drill chuck according to claim 3, wherein the liquid plastic component is provided with a metal shell as a structure to transmit force forward; the component fixed on the drill body is supported on a step on the drill body and padded under the metal shell; and the structure for exerting and transmitting force to the liquid plastic component is provided with a piston; the component fixed on the drill body is provided with a piston hole, and the piston passes through the piston hole on the component fixed on the drill body.

5. The strength-boosting drill chuck according to claim 3, wherein the liquid plastic component is provided with a metal shell as a structure to transmit force forward; the component fixed on the drill body is supported on a step on the drill body and padded under the metal shell; and a bottom wall of the metal shell is also provided with a piston hole, and the piston passes through the piston hole on the component fixed on the drill body and the bottom wall of the metal shell.

6. The strength-boosting drill chuck according to claim 1, wherein the clutch connection structure includes a radially elastic ring and the ring piece is axially limited; the structure for exerting force to the liquid plastic part is provided with a connecting sleeve, and the ring is located between the connecting sleeve and the nut, which an inner side of the ring is configured to be able to cooperate with a nut keyway for connection, and an outer side is configured to be connected with the connecting sleeve; the ring is configured with a control structure, so that when the drill chuck is not in the clamping state, the ring and the nut are connected through matching keyway, and the ring is not connected with the structure for exerting force to the liquid plastic component; when the drill chuck is in the clamping state, the ring is disengaged from the keyway connection with the nut, and is connected to the connecting sleeve on the outer side.

7. The strength-boosting drill chuck according to claim 6, wherein a lower end of the nut is provided with a convex edge, and a key provided inside the ring cooperates with the convex edge to be performed axial limit at a lower side thereof.

8. The strength-boosting drill chuck according to claim 6, wherein the control structure is provided between the ring and the nut.

9. The strength-boosting drill chuck according to claim 1, wherein the clutch connection structure comprises a radially elastic ring and the ring is configured to be able to cooperate with a nut keyway for connection; the ring is configured with a control structure, so that when the drill chuck is not in the clamping state, the ring and the nut are connected through matching keyway, and the ring is not connected with the structure for exerting force to the liquid plastic component; when the drill chuck is in the clamping state, the ring is disengaged from the keyway connection with the nut, and connected to the structure for exerting force to the liquid plastic component.

10. The strength-boosting drill chuck according to claim 9, wherein the structure for exerting force to the liquid plastic component is provided with a piston;

the liquid plastic component is provided with a piston hole, and the piston exerts force to the liquid plastic component through the piston hole or from outside of the liquid plastic component;

when the drill chuck is in the clamping state, the ring and the nut are disengaged from the matching keyway connection, and the ring is elastically deformed to exert force to the piston to achieve the connection with the structure for exerting force to the liquid plastic component.

11. The strength-boosting drill chuck according to claim 1, wherein the liquid plastic component is provided with a metal shell as a structure for forwardly transmitting force.

12. The strength-boosting drill chuck according to claim 1, wherein the liquid plastic component is an annular component, and an axial support structure is provided behind the liquid plastic component.

13. The strength-boosting drill chuck according to claim 12, wherein a piston hole is provided at a lower end of the liquid plastic component.

\* \* \* \* \*